US012243138B2

(12) United States Patent
Springer et al.

(10) Patent No.: US 12,243,138 B2
(45) Date of Patent: Mar. 4, 2025

(54) VIRTUAL BACKGROUND SYNCHRONIZATION

(71) Applicant: Zoom Communications, Inc., San Jose, CA (US)

(72) Inventors: Shane Paul Springer, Oregon City, OR (US); Ryan Weddle, Alexandria, VA (US); Servio Lee, San Francisco, CA (US); Irina Cohen, Paramus, NJ (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 18/648,888

(22) Filed: Apr. 29, 2024

(65) Prior Publication Data

US 2024/0273795 A1    Aug. 15, 2024

Related U.S. Application Data

(63) Continuation of application No. 17/852,357, filed on Jun. 28, 2022, now Pat. No. 12,002,137, which is a continuation of application No. 17/246,571, filed on Apr. 30, 2021, now Pat. No. 11,475,615.

(51) Int. Cl.
*G06T 11/60*      (2006.01)
*G06V 10/70*      (2022.01)

(52) U.S. Cl.
CPC ............. *G06T 11/60* (2013.01); *G06V 10/768* (2022.01)

(58) Field of Classification Search
CPC ........................................................ G06T 11/60
See application file for complete search history.

(56) References Cited

U.S. PATENT DOCUMENTS

| 6,853,398 | B2 | 2/2005 | Malzbender et al. |
| 9,503,685 | B2 | 11/2016 | Baron, Jr. et al. |
| 2014/0320591 | A1* | 10/2014 | Baron, Jr ................. H04N 7/15 348/14.08 |
| 2015/0154291 | A1 | 6/2015 | Shepherd et al. |
| 2017/0019633 | A1* | 1/2017 | Shaburov ............. G06V 40/161 |
| 2017/0142371 | A1* | 5/2017 | Barzuza ................ H04L 65/403 |
| 2019/0147229 | A1 | 5/2019 | Zatepyakin et al. |
| 2022/0239847 | A1* | 7/2022 | Swierk .................. G06N 3/084 |
| 2023/0101672 | A1* | 3/2023 | LaFave .............. G06F 3/04842 715/753 |

OTHER PUBLICATIONS

International Search Report and Written Opinion mailed on Jul. 14, 2022 in corresponding PCT Application No. PCT/US2022/026235.

* cited by examiner

*Primary Examiner* — Shivang I Patel
(74) *Attorney, Agent, or Firm* — Young Basile Hanlon & MacFarlane, P.C.

(57) ABSTRACT

A virtual background associated with a first user of a virtual meeting is identified. In response to identifying the virtual background associated with the first user, a device associated with a second user of the virtual meeting is synchronized to use the virtual background during the virtual meeting. A composite video depicting the first user or the second user overlaid on the virtual background is generated for display on a device connected to the virtual meeting.

20 Claims, 14 Drawing Sheets

Planned Meeting Contextual Information

202 — Meeting Title

204 — ABC CO – discuss Product A

Meeting Location

206 — https://cognitionip.zoom.us/j/123?pwd=adZQE1

210 — 212 Meeting Attendees

- username1@domain1.com
- username2@domain1.com
- username1@domain2.com
- username2@domain2.com
- username1@domain3.com Meeting Date and Time 208 — March 30, 2021
10:00 am to 11:am Pacific Time - Los Angeles Time Zone Meeting Description The agenda for the meeting is to discuss customer success.

Figure 2

Preconfigured Rules Evaluation Process

400

410 — For each of 1 of *n* preconfigured rules:

420 — Determine *m* keywords of the particular *nth* rule.

430 — For each of 1 of *m* keywords, determine whether a match exists as to a word, text or character string in the meeting contextual information.

440 — Match Found

No → (loops back to 430)

Yes ↓

450 — Select virtual background associated with the particular *nth* rule, and use the virtual background for the video meeting.

Figure 4

VIRTUAL BACKGROUND SYNCHRONIZATION

CROSS-REFERENCE TO RELATED APPLICATIONS

This application is a continuation of U.S. patent application Ser. No. 17/852,357, filed Jun. 28, 2022, which is a continuation of U.S. patent application Ser. No. 17/246,571, filed Apr. 30, 2021, is the entire disclosures of which are hereby incorporated by reference.

FIELD OF INVENTION

The present invention relates generally to digital communication, and more particularly, to systems and methods providing for video communications with dynamic virtual backgrounds within a video communication platform.

BACKGROUND

During video communications while using a video conferencing application or system, such as on a mobile device, smart phone or a laptop, a user may select a virtual background that is displayed as an image or video behind a live video feed of a user. These systems may use computer vision processing techniques to extract an outline (e.g., a border of the user) and then display the virtual background about or around the user during video communications with other users. However, users need to manually select a virtual background to be used for a meeting or assign a default virtual background to be used for all meetings. While providing some flexibility in the choice of a virtual background to be used for video communication, contextual information of a planned meeting with other users is not utilized by these systems. This often results in situations where users may use inconsistent virtual backgrounds. For example, when employees of one company meet with employees of another company, some of the employees of the same company may be using different virtual backgrounds. The current state-of the-art video conferencing systems lack the ability to automatically provide for consistency and uniformity of the virtual backgrounds used among users participating in a video meeting. These current state-of-the-art systems also lack the ability to automatically or dynamically choose a virtual background to be used by meeting participants.

Thus, there is a need in the field of digital communication to create a new and useful system and method for providing video communications with dynamic virtual background selection within a video communication platform based on rules that evaluate contextual meeting information. The source of the problem, as discovered by the inventors, is a lack of an ability for multiple video meeting participants to dynamically select a virtual background prior to a meeting, where the selection of the virtual background is based on either predefined rules and/or contextual information about a meeting.

SUMMARY

The invention overcomes the existing problems by providing a rule-based selection and/or contextual-based selection of virtual backgrounds for use during a video meeting within a video communication platform. The system leverages an integrated calendar connection to maintain awareness of various calendar details. These calendar details are evaluated by the system to automatically assign a particular virtual background for a user based upon predefined virtual background usage rules.

The video communication system provides functionality allowing a user to set rules or conditions where the system selects a virtual background be used by the user during video communications with other users of the system. These user defined rules provide for the automatic selection of virtual background based on contextual information of a planned meeting. The rules are evaluated by the system and compared against information of the planned meeting. Based on information of the planned meeting, the system may determine a virtual background to be used by the user for the planned meeting.

The user defined rules may include key words and Boolean logical operators to be compared against the information of the planned meeting. The rules may be simple comparisons of key words to be found in a planned meeting, or complex rules using various syntax and logical constructs to determine whether the rule criteria or conditions are met.

The system is flexible in the sources of where meeting information is retrieved, and the manner in which a virtual background may be selected for use. The planned meeting information may be retrieved from a calendaring application or other databases that stores electronic meeting information. These data sources may be resident on a user device and/or stored in a cloud-based storage system or service.

The rules may evaluate various data of the planned meeting information, such as whether particular users or participants are attending the planned meeting, whether particular e-mail domain names exist, whether certain words occur in information descriptive of meeting, whether the meeting is scheduled during certain times or dates, the number of meeting participants, and so forth.

If the rule criteria or conditions are met, then the system selects a virtual background that has been associated with the rule. A user, for example, may create a rule and then the system may select or assign a virtual background to be used when the system determines that the rule criteria is met.

The user created rules provides for consistent use of virtual backgrounds for video communications with other users. The system may automatically select the same virtual background for various planned meetings in which the user participates. For example, users may have many repeating meetings, or meetings with similar user participants. A user may only need to set up a rule once, and the system then may use the rule to select the same virtual background for future or subsequent repeating planned meetings.

Some users may use the video communication system to engage in video communications in different contexts, such as using the video communication system for video meetings in a business context or personal context. The system dynamically selects a virtual background for use based on particular contextual information of the planned meeting. The system functionality provides for the automatic selection of the virtual background based on the meeting context.

Methods, systems, and apparatus, including computer programs encoded on computer storage media relate to a method for providing video communications with dynamic virtual backgrounds within a communication platform. The system provides one or more preconfigured rules for the selection of one or more virtual backgrounds to be used for planned video meetings. Based on the contextual information of a planned video-based meeting, the system may select a virtual background to be used for the meeting. During the video-based meeting, the system generates for display, on one or more client devices, a composite video depicting the imagery of the user overlaid on imagery of the selected virtual background.

One embodiment relates to a communication system configured to perform a number of operations. First, the system provides one or more preconfigured rules for the selection of one or more virtual backgrounds to be used for planned meetings. The system receives or determines contextual information about a planned meeting. The system evaluates contextual information about the planned meeting and applies preconfigured rules to select a virtual background to be used for video-based communication during the planned meeting. The system enables video communications for a first user with one or more multiple other users. The system receives video data depicting video imagery of the first user. The video data may include multiple video frames of the first user. The system determines a boundary about the first user in the video frames. The boundary includes an interior portion and exterior portion. The interior portion represents the user, and the exterior portion represents an area that may be replaced with a virtual background. The system generates for display on one or more client devices, a composite video of the interior portion depicting imagery of the first user overlaid on imagery of the selected virtual background.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present invention relates generally to digital communication, and more particularly, to systems and methods providing for containment of sensitive data within a communication or messaging platform.

The present disclosure will become better understood from the detailed description and the drawings, wherein:

FIG. 2 is a diagram illustrating an example of planned meeting contextual information.

FIG. 4 is a flow chart illustrating an exemplary method 400 that may be performed in some embodiments.

DETAILED DESCRIPTION

Figure 1A:
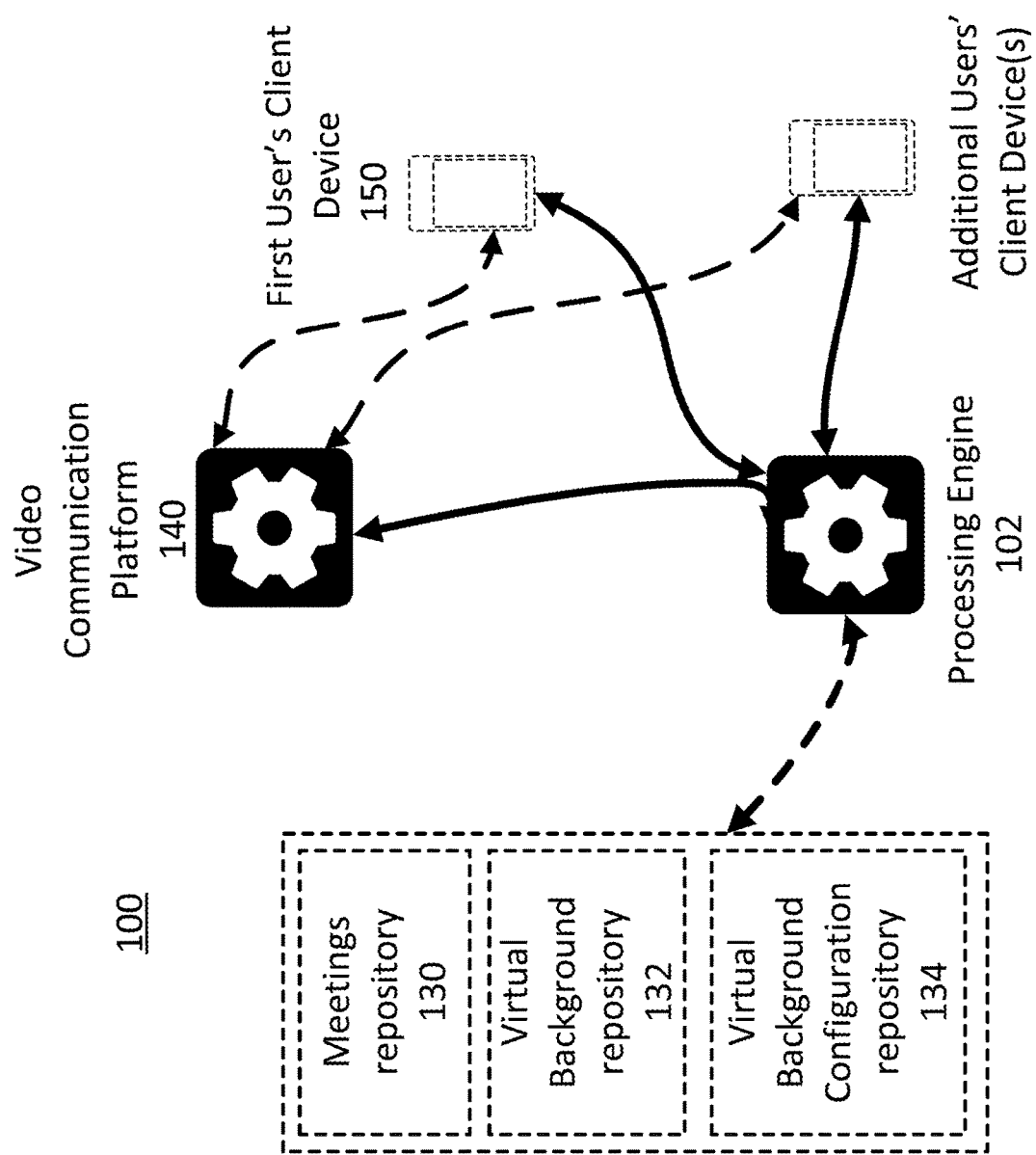
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Many other possibilities and options can be contemplated for this use case and others, as will be described in further detail throughout.

Exemplary Environments

FIG. 1A is a diagram illustrating an exemplary environment in which some embodiments may operate. In the exemplary environment 100, a first user's client device 150 and one or more additional users' client device(s) 160 are connected to a processing engine 102 and, optionally, a video communication platform 140. The processing engine 102 is connected to the video communication platform 140, and optionally connected to one or more repositories and/or databases, including a user account repository 130, video content repository 132, and/or an annotation repository 134. One or more of the databases may be combined or split into multiple databases. The first user's client device 150 and additional users' client device(s) 160 in this environment may be computers, and the video communication platform server 140 and processing engine 102 may be applications or software hosted on a computer or multiple computers which are communicatively coupled via remote server or locally.

The exemplary environment 100 is illustrated with only one additional user's client device, one processing engine, and one video communication platform, though in practice there may be more or fewer additional users' client devices, processing engines, and/or video communication platforms. In some embodiments, one or more of the first user's client device, additional users' client devices, processing engine, and/or video communication platform may be part of the same computer or device.

In an embodiment, the processing engine 102 may perform the method 200 (FIG. 2) or other method herein and, as a result, provide multi-point video presentations with live annotations within a video communication platform. In some embodiments, this may be accomplished via communication with the first user's client device, additional users' client device(s), processing engine, video communication platform, and/or other device(s) over a network between the device(s) and an application server or some other network server. In some embodiments, the processing engine 102 is an application, browser extension, or other piece of software hosted on a computer or similar device, or is itself a computer or similar device configured to host an application, browser extension, or other piece of software to perform some of the methods and embodiments herein.

The first user's client device 150 and additional users' client device(s) 160 are devices with a display configured to present information to a user of the device. In some embodiments, the first user's client device 150 and additional users' client device(s) 160 present information in the form of a user interface (UI) with UI elements or components. In some embodiments, the first user's client device 150 and additional users' client device(s) 160 send and receive signals and/or information to the processing engine 102 and/or video communication platform 140. The first user's client device 150 is configured to perform functions related to presenting and playing back video, audio, documents, annotations, and other materials within a video presentation (e.g., a virtual class, lecture, webinar, or any other suitable video presentation) on a video communication platform. The additional users' client device(s) 160 are configured to viewing the video presentation, and in some cases, presenting material and/or video as well. In some embodiments, first user's client device 150 and/or additional users' client device(s) 160 include an embedded or connected camera which is capable of generating and transmitting video content in real time or substantially real time. For example, one or more of the client devices may be smartphones with built-in cameras, and the smartphone operating software or applications may provide the ability to broadcast live streams based on the video generated by the built-in cameras. In some embodiments, the first user's client device 150 and additional users' client device(s) are computing devices capable of hosting and executing one or more applications or other programs capable of sending and/or receiving information. In some embodiments, the first user's client device 150 and/or additional users' client device(s) 160 may be a computer desktop or laptop, mobile phone, virtual assistant, virtual reality or augmented reality device, wearable, or any other suitable device capable of sending and receiving information. In some embodiments, the processing engine 102 and/or video communication platform 140 may be hosted in whole or in part as an application or web service executed on the first user's client device 150 and/or additional users' client device(s) 160. In some embodiments, one or more of the video communication platform 140, processing engine 102, and first user's client device 150 or additional users' client devices 160 may be the same device. In some embodiments, the first user's client device 150 is associated with a first user account on the video communication platform, and the additional users' client device(s) 160 are associated with additional user account(s) on the video communication platform.

In some embodiments, optional repositories can include one or more user account repositories 130, meetings repositories 132, virtual background repositories 134 and/or virtual background configuration repositories 136. The optional repositories function to store and/or maintain, respectively, user account information associated with the video communication platform 140, video content received by the video communication platform 140 for display within video communication, and virtual background, which may include images, video and other graphical visual content. The optional database(s) may also store and/or maintain any other suitable information for the processing engine 102 or video communication platform 140 to perform elements of the methods and systems herein. In some embodiments, the optional database(s) can be queried by one or more components of system 100 (e.g., by the processing engine 102), and specific stored data in the database(s) can be retrieved.

Video communication platform 140 is a platform configured to facilitate video presentations and/or communication between two or more parties, such as within a video conference or virtual classroom.

Figure 1B:
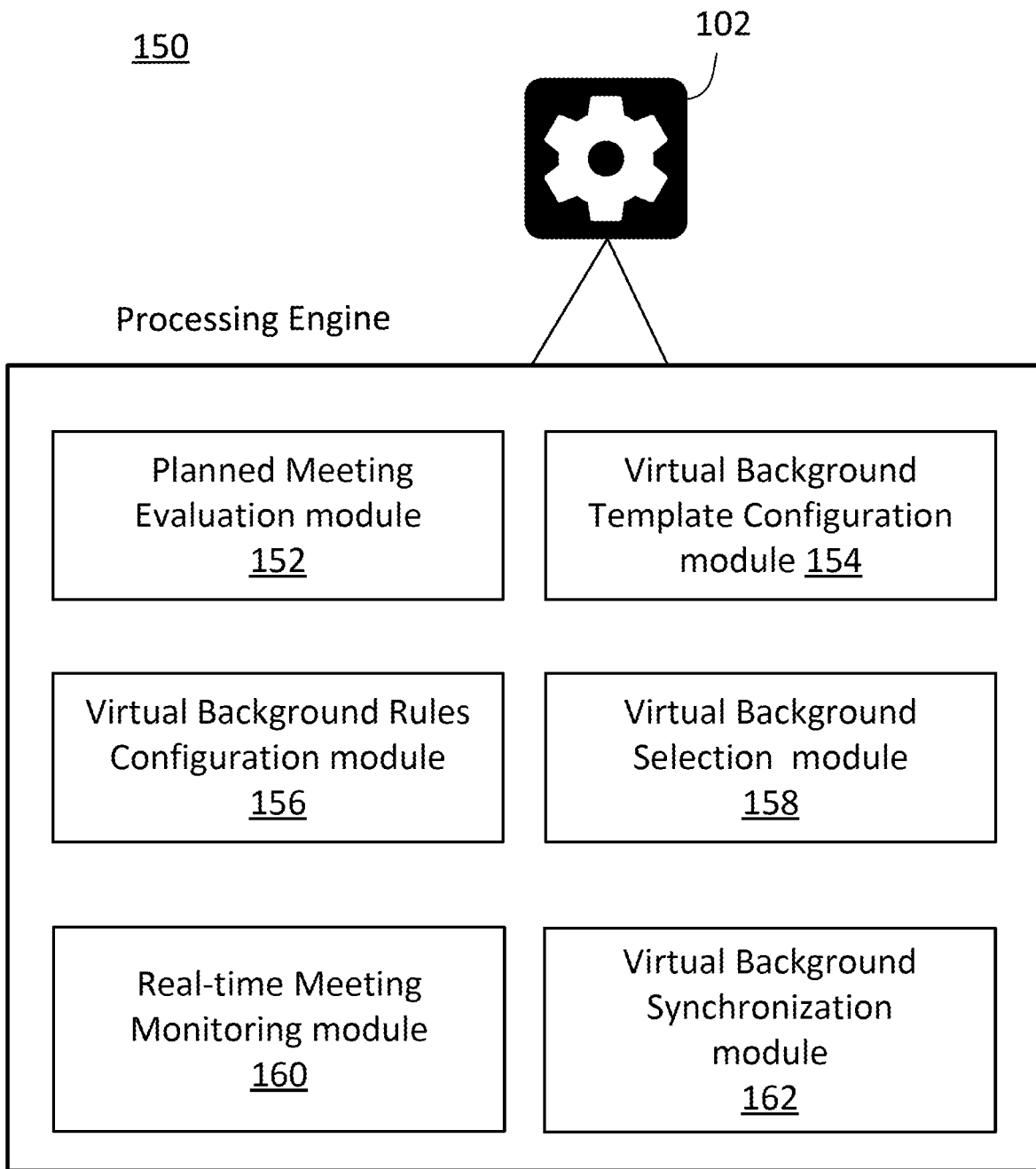
FIG. 1B is a diagram illustrating an exemplary computer system that may execute instructions to perform some of the methods herein.

FIG. 1B is a diagram illustrating an exemplary computer system 150 with software modules that may execute some of the functionality described herein.

The Planned Meeting Evaluation module 152 provides system functionality for the interaction and retrieval planned meeting contextual information from calendaring systems and/or database, and as further described herein.

The Virtual Background Template Configuration module 154 provides system functionality for the configuration, processing, storage and management of virtual background templates, and as further described herein.

The Virtual Background Rules Configuration module 156 provides system functionality for the selection, creation, configuration, processing, storage and management of virtual background selection rules, and as further described herein.

Virtual Background Selection module 158 provides system functionality for the selection, creation, configuration, processing, storage and management of particular virtual backgrounds.

Virtual Real-time Meeting Monitoring module 160 provides system functionality for the monitoring and evaluation of meeting that are in progress to identify and determine real-time video communications, audio communications and textual communications, and as further described herein.

Virtual Background Synchronization module 162 provides system functionality for the synchronization of virtual backgrounds among users of a meeting, and as further described herein.

The above modules and their functions will be described in further detail in relation to an exemplary methods and systems below.

Virtual Background Files

A virtual background file may be a file such as a video file, an image files (e.g., a jpeg, gif, etc.), or any other type of graphics or multimedia file. In general, a virtual background file is of a file of any type that allows for the system to present a still graphic image and/or a video image as a virtual background in conjunction with a user's video feed. The virtual background file may be stored on a file system, computer system memory, either in local storage or in a server-based storage system or database. The system retrieves the virtual background file to be used by the system as a virtual background while a user is engaged in video communications with one or more other users. The virtual background files may be cataloged or indexed by the system and associated with rules for the selection of particular virtual background files.

Planned Meeting Contextual Information

FIG. 2 is a diagram illustrating an example of planned meeting contextual information.

The system 100 may retrieve from a meetings repository, such as a calendar application, information that is specific to a planned meeting event. By way of illustration, FIG. 2 depicts common information typically stored by a calendaring application. A planned meeting event may include a title 202, a meeting location 204, a meeting date and time 206, a list of meeting attendees 210 and other information. The listing of meeting attendees usually are identified in the format of username@domain-name. For example, a meeting attending might be identified with the email address JAppleseed@cam.com. Often a user creating a meeting, via a calendaring application, will provide a meeting title 202 to provide context for the meeting.

In some embodiments, preconfigured rules (as described herein) may use conditions and/or parameters that are evaluated against contextual information of a planned meeting. For instance, by way of illustration, but not limitation, some contextual information that may be evaluated by the system include: the title of the meeting, number of meeting participants, the time zone of one or more meeting participants, the description of the meeting, the particular participant user ids, email address or time zone of meeting participants.

The planned meeting contextual information may be presented, via a user interface, such as a calendaring application user interface. In some embodiments, the calendaring application user interface may provide for the association of a virtual background file, via user interaction with the calendaring application user interface. For example, the calendaring application user may display a graphical icon where a user may upload or assign a particular virtual background to be used by one or more attendees of a meeting.

Virtual Background Selection Rules

In some embodiments, preconfigured rules for virtual background selection may be user defined, automatically generated by the system, preconfigured by the system for a user and/or the rules shared among users. The system provides functionality allowing a user to define conditions and/or parameters where a virtual background file is automatically selected for use as a virtual background for prospective meetings. In determining which virtual background to select, the system evaluates contextual information of a planned meeting, and then applies the preconfigured rule to the contextual information to determine whether the criteria for the selection of a virtual background are met. Where the conditions and/or parameters for the selection of a virtual background are met, then the system selects the virtual background to be used for user video communications.

The system may automatically generate preconfigured rules for a user for the selection of a virtual background to be used for video communications. The system may evaluate historical meeting information from a calendaring system, or other electronic repository having past meeting information for the user. The system may store information about a prior selected virtual background that was used or assigned for use for users for various meetings. The system may determine commonality about contextual information of the various meeting, and automatically generate a preconfigured rule for a user to select a virtual background for prospective meetings. For example, the system may determine that a user used the same virtual background where the meeting participants included a specific user email domain name, or a particular user email address. The system then may create a preconfigured rule to automatically select the same virtual background that was previously used, where the user has a planned meeting with any other users having a similar email domain name and/or if the particular user email address is found in the contextual information of a planned meeting.

In another example, the system may determine that a user typically uses the same virtual background (such as an image with the user's company logo) where the title of a meeting (as found in the meeting contextual information) is called "Company All-hands". The system may then generate a preconfigured rule for that user where the system would evaluate the contextual information of a planned meeting for keywords of "Company All-hands" (either case-sensitive or not), and then associate the previously used virtual background for the planned meeting where the preconfigured rule criteria is met. In this instance, the system would automatically select the image of the user's company logo, when the title of a planned meeting includes the keywords "Company All-hands".

The system provides functionality where users may share their preconfigured rules with other users. The system may provide a user interface where a user may select one or more preconfigured rules to send to one or more other users. The selection user interface may allow for the input of user names and/or email addresses to whom the preconfigured rules would be shared. When sharing the preconfigured rule, the system provides the rule name, conditions and parameters, and copy of the underlying virtual background file to the other user. This functionality provides for one user to share a preconfigured rule with the other users. The other users may now use or modify the preconfigured rules for their own meetings.

In some embodiments, the preconfigured rules may be given a rule priority order or weight for consideration by the system. In other words, the system may receive an indication that a rule has a higher priority than another rule. For example, the preconfigured rules may be given a rank or priority order for evaluation by the system. In one embodiment, a user interface may display a listing of the preconfigured rules, and the order of the rules (for example, top to bottom) indicate the order or priority that the system will evaluate the rule. In another embodiment, a user interface may receive a ranking number to indicate the order the preconfigured rule would be evaluated by the system.

In some embodiments, the conditions and/or parameters of a preconfigured rule may include key words to match, Boolean logic operators to find matches (such as "and", "or"), wild card operators and different character strings. A preconfigured rule may also include negative operators to preclude when a virtual background is not to be used. For example, a user may have personal based virtual backgrounds that are used when video conferencing with family or friends, and may not want to have the virtual background used for company or business meetings. The user may identify conditions and/or parameters of when not to use a particular virtual background for certain meeting contextual information. In this instance, this would preclude use of the virtual background from being automatically selected for those do not use meeting situations. Also, the system may be configured to preclude the user from manually selecting the virtual background is such situations, or at least prompt the user noting the virtual background has been precluded for use for the particular meeting at hand, and then allowing the user to override the preconfigured rule is the user so desires.

In some embodiments, the system may in some instances, select two or more virtual backgrounds that may be used for a video meeting based on the application of two or more preconfigured rules as applied to contextual information of a planned meeting. In such a case, the system may present to the user a user interface depicting two or more graphical representations of the selected two or more virtual backgrounds. The system may receive a selection from a user for one of the displayed graphical representations. The system then would use the virtual background associated with the received selection of the graphical representation for use as a virtual background for the user during video communications.

Exemplary Methods and User Interfaces

Virtual Background Selection

Figure 3:
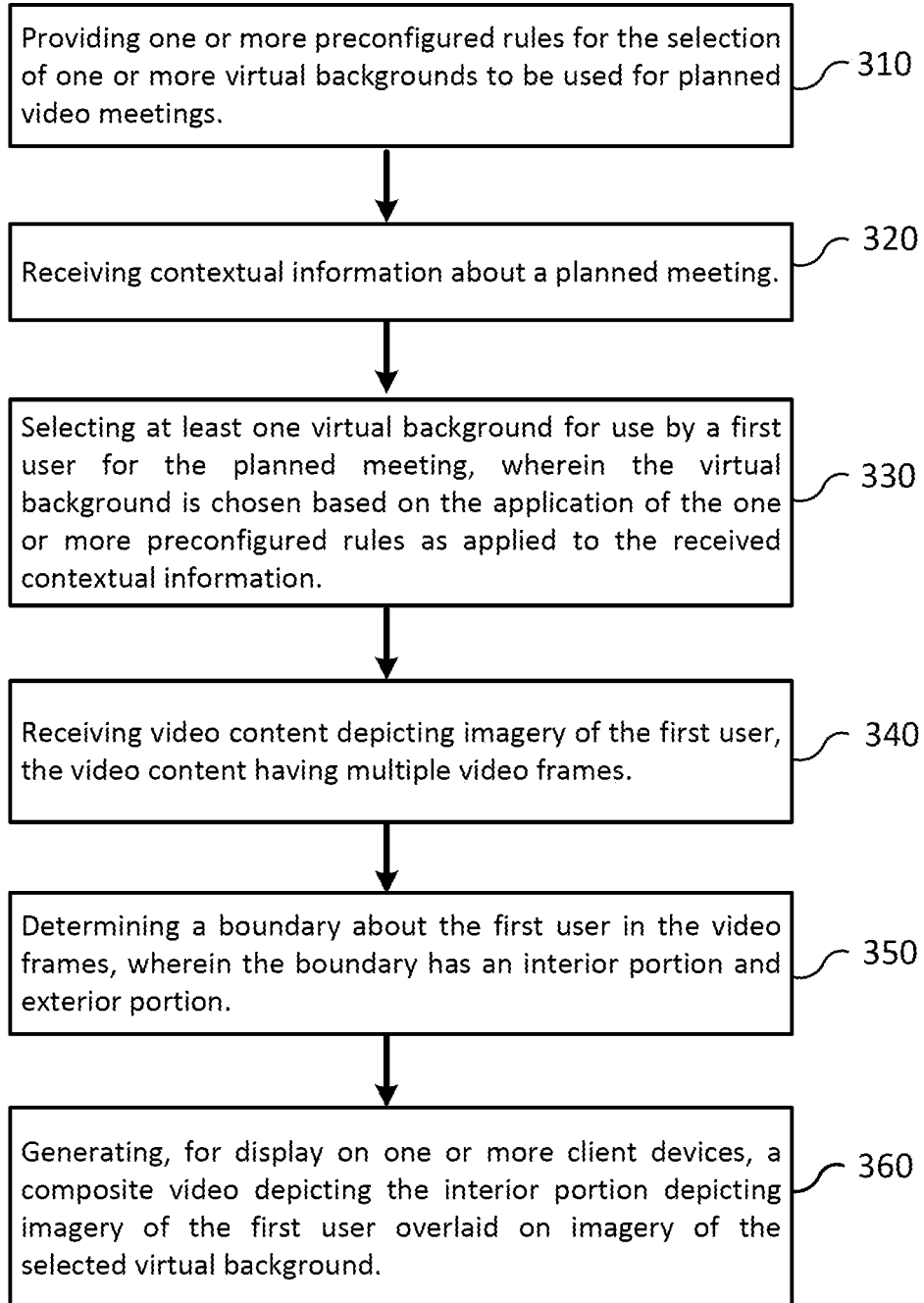
FIG. 3 is a flow chart illustrating an exemplary method 300 that may be performed in some embodiments.

FIG. 3 is a flow chart illustrating an exemplary method 300 that may be performed in some embodiments. In one embodiment, the system 100 provides for virtual background selection using preconfigured rules. The system 100 provides functionality where a user may define a rule to select a particular virtual background to be used for a planned video meeting. The system evaluates planned meeting contextual information and determines a specific virtual background to be used for video communication. In some instances, two or more rules may be applicable and result in the selection of two different virtual backgrounds for use. In the case, the system may present a user interface displaying a representation of the two virtual backgrounds, and receive a selection for the desired virtual background to be used during video communications by the user.

At step 310, the system 100 provides one or more preconfigured rules for the selection of one or more virtual backgrounds to be used for planned video meetings. The preconfigured rules may be stored on a local or cloud data storage device and retrieved by the system.

At step 320, the system 100 receives contextual information about a planned meeting. For example, the system may retrieve contextual information from a calendaring system or other database storing contextual information about planned meetings.

At step 330, the system 100 selects at least one virtual background for use by a first user for the planned meeting. The system may select a virtual background based on the application of one or more preconfigured rules as applied to the received contextual information of the planned meeting.

At step 340, the system 100 receives video content depicting imagery of the first user, the video content having multiple video frames. The system provides functionality for a user to capture and display video imagery to other users. For example, the system may receive a video stream from digital camera depicting imagery of the first user.

At step 350, the system determines a boundary about the first user in the video frames, wherein the boundary has an interior portion and exterior portion. The system may use various computer vision techniques to identify the border or outline of the user depicted in the video.

At step 360, the system 100 generates, for display on one or more client devices, a composite video depicting the interior portion depicting imagery of the first user overlaid on imagery of the selected virtual background. The system combines or composites video imagery of the user shown with the selected virtual background.

FIG. 4 is a flow chart illustrating an exemplary method 400 that may be performed in some embodiments. The method 400 show an example of processing multiple preconfigured rules, where the rules are evaluating the meeting contextual information.

The method of evaluating meeting contextual information is illustrated for a search and match process for multiple preconfigured rules, with each preconfigured rule searching for and matching key words. The system may retrieve from a data storage device multiple preconfigured to determine a virtual background filed to be selected for a user as a virtual background during video communications with other users. In step 410, the system evaluates one or more retrieved n preconfigured rules. In step 420, the system determines particular keys words for the particular nth rule. The system determines the rule's logical operators and syntax, for example, determining which key words to match to planned meeting contextual information. For example, one or more key words may be required to be matched to meeting contextual information for a particular virtual background file to be selected.

At step 430, the system compares or tries to find matches of the key words with contextual information of a planned meeting. At step 440, the system determines whether or not a match was found. For each of the key words, the system determines whether all of the key words are found. If all of the key words are matched to contextual information of the meeting, then the system may then select a virtual background file that was associated with the preconfigured rule (step 450). The system would use the virtual background file to provide the virtual background during video communications by the user. While a simple key word match may be configured as a rule, more complex rules, operations, parameters and conditions may be required for a preconfigured rule. If no required key word matches are found, then next preconfigured rule is then evaluated against the contextual information, and so on until no more rules exist (looping back to step 430). The system may be configured such that a particular virtual background file would be used if none of the preconfigured rules apply to the contextual meeting information.

Figure 5A:
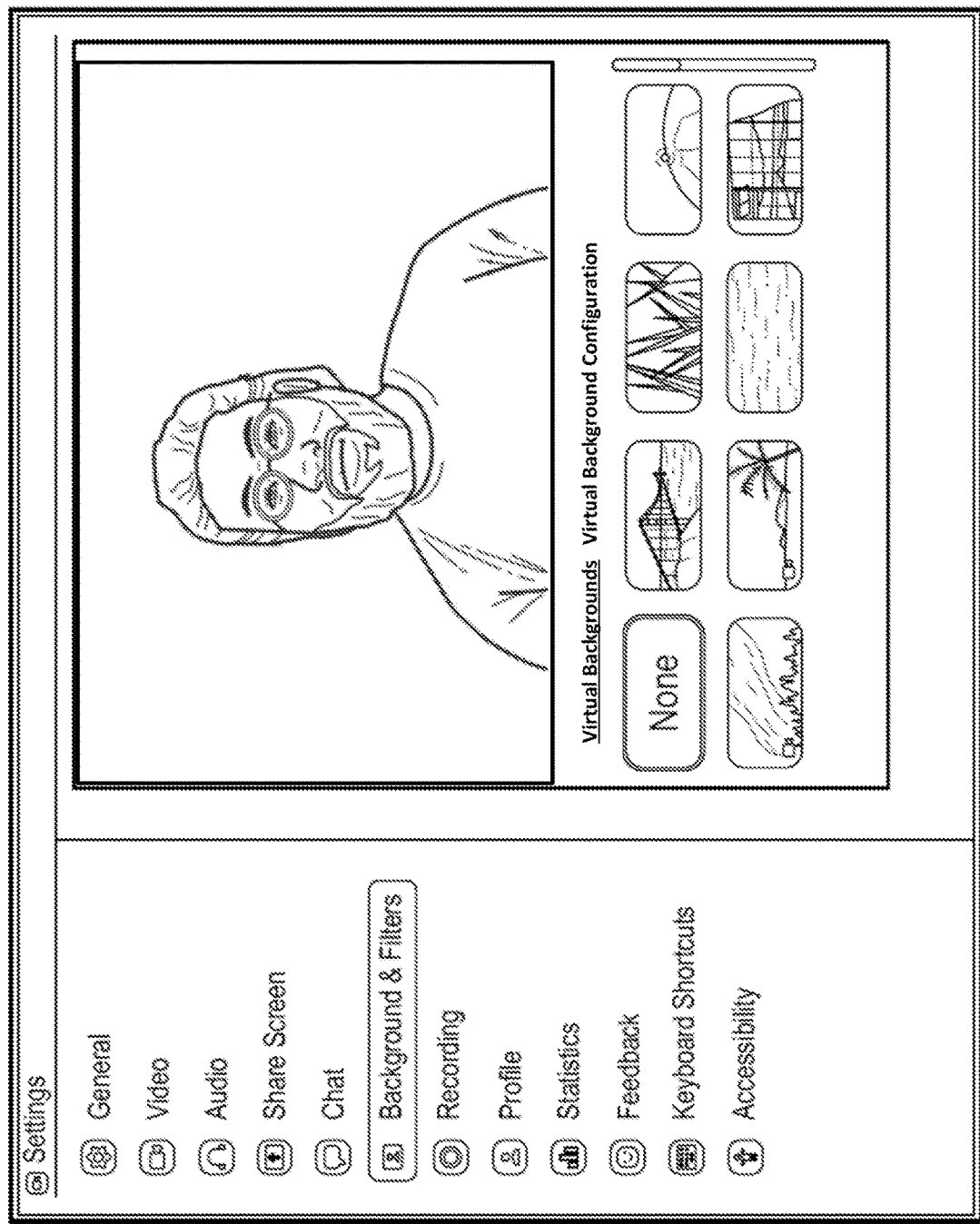
FIG. 5A illustrates an example user interface 500 according to one embodiment of the present disclosure.

FIG. 5A illustrates an example user interface according to one embodiment of the present disclosure. The system 100 may generate and display a user interface 500 where a user may select a virtual background to use as a default virtual background. The user interface 500 may provide a selection for virtual background configuration where the user interface 500 provides functionality where a user may configure one or more rules for the selection of a virtual background to be used for a planned video meeting.

Figure 5B:
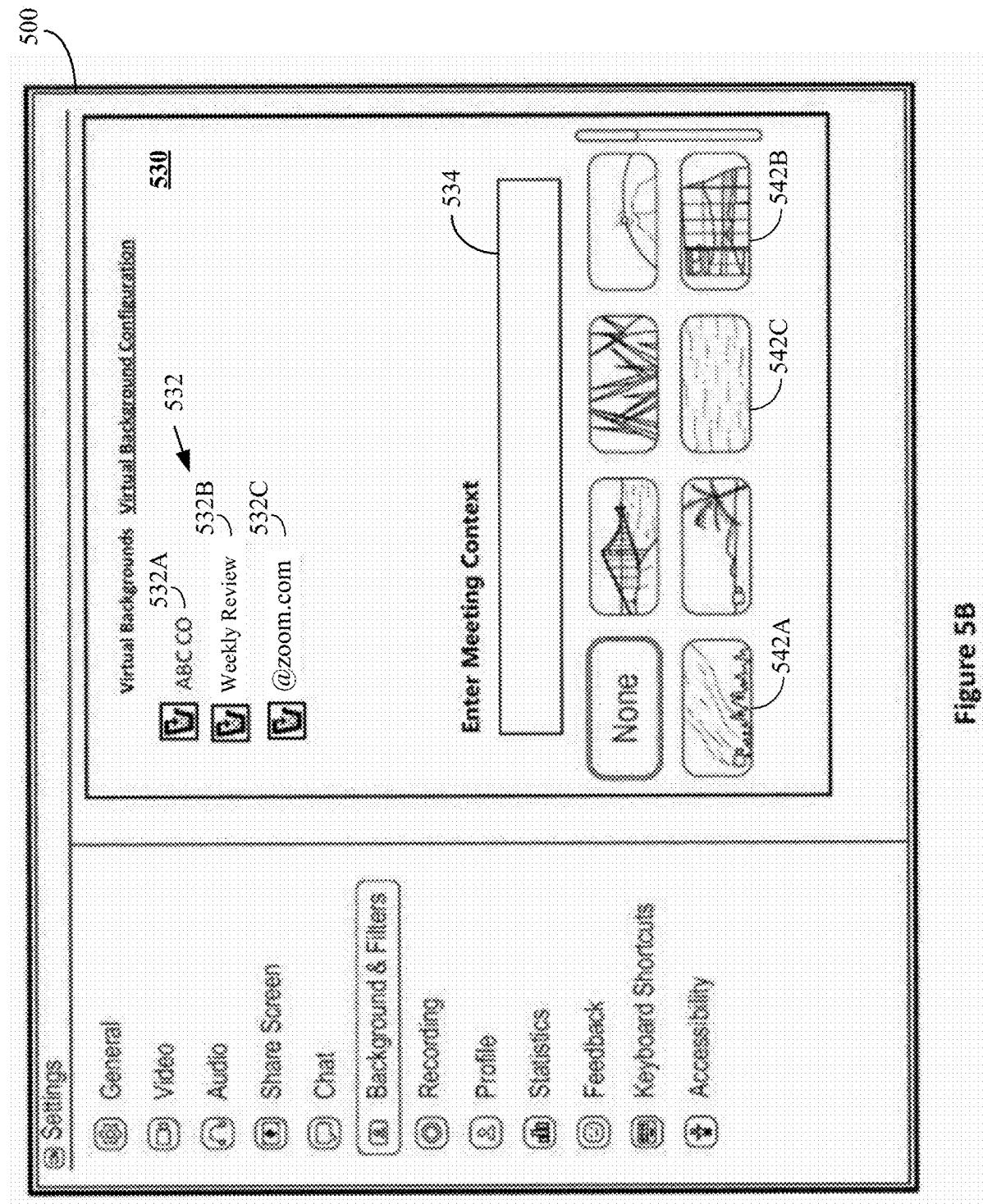
FIG. 5B illustrates an example user interface 500 according to one embodiment of the present disclosure.

FIG. 5B illustrates an example user interface 500 according to one embodiment of the present disclosure. In response to the selection of "Virtual Background Configuration" text, the system 100 may display the user interface section 530. The user interface section 530 depicts a listing of key terms and a group of virtual background from which a virtual background may be selected to be used when the key words are found in the contextual information for a planned meeting. The listing of key words 532 may be removed by the selection of the trashcan icon to the left of a particular key word.

The following example illustrates how a user may interact with the user interface section 530. A user may want to set or select a virtual background to be used for a planned meeting. The user would enter key words into the input text box 534. In the examples 532A, 532B and 532C, a user had typed in text in the user interface input text box 534. From the listing of virtual backgrounds, the user had also selected a particular virtual background to be used for the input key words.

In one example, for the key words "ABC CO" 532A, a user may have selected the graphical representation of virtual background 542A to be used when a planned meeting's contextual information includes the key words "ABC CO". As will be described further below, the system 100 may evaluate the planned meeting contextual information to identify that the planned meeting has the phrase "ABC CO". In such a case, the system 100 will select and utilize the virtual background that is associated with the graphical representation of virtual background 542A to be used as a virtual background for the user during video communications with other users.

In another example, for the key words "Weekly Review" 532B, a user may have selected the graphical representation of virtual background 542B to be used when a planned meeting's contextual information includes the key words "Weekly Review". As will be described further below, the system 100 may evaluate the planned meeting contextual information to identify that the planned meeting has the phrase "Weekly Review" for instance in the title of the meeting. In such a case, the system 100 will select and utilize the virtual background that is associated with the graphical representation of virtual background 542B to be used as a virtual background for the user during video communications with other users.

In yet another example, for the key words "@zoom.com" 532C, a user may have selected the graphical representation of virtual background 542C to be used when a planned meeting's contextual information includes the key words "@zoom.com". As will be described further below, the system 100 may evaluate the planned meeting contextual information to identify that the planned meeting has the phrase "@zoom.com", for instance in the e-mail address of one of the meeting participants. In such a case, the system 100 will select and utilize the virtual background that is associated with the graphical representation of virtual background 542C to be used as a virtual background for the user during video communications with other users.

Figure 5C:
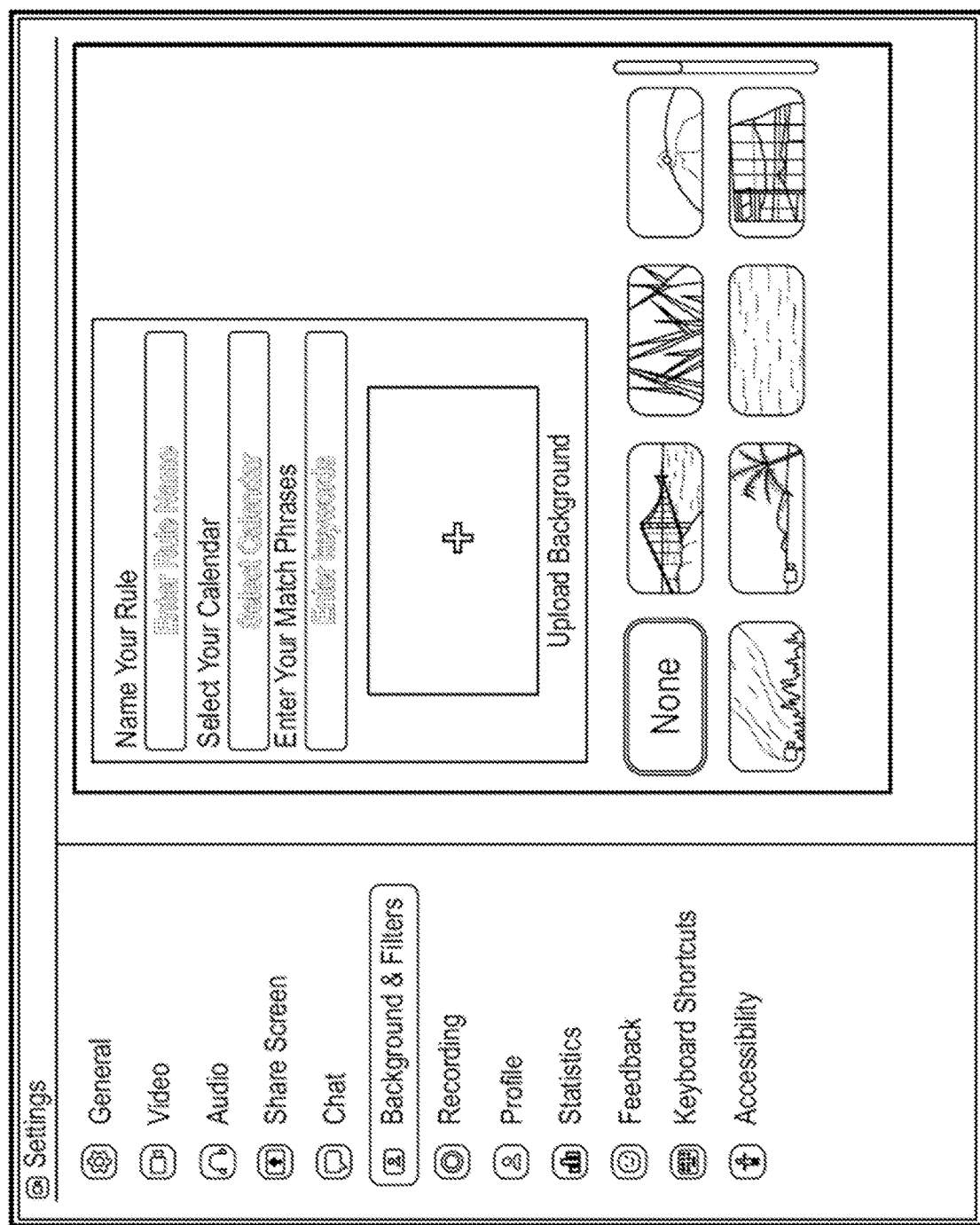
FIG. 5C illustrates an example user interface 500 according to one embodiment of the present disclosure.

FIG. 5C illustrates an example user interface according to one embodiment of the present disclosure. In this embodiment of the user interface, the system 100 may present the user interface with an input section where the user interface may receive a selection for the name of a rule, a selection or input for a user calendar associated with the rule (e.g., Outlook.com, Gmail.com, iCloud.com, etc.), and one or more key words to be matched for a planned meeting's contextual information. In this embodiment, the user interface may upload a virtual background to the system local or cloud-based storage repository in association with an account and/or user id of the user.

Automatic Virtual Background Rule Generation

In some embodiments, the system 100 may evaluate the historical use of virtual backgrounds that were previously used for a meeting, and automatically construct rules for use of virtual backgrounds for planned meetings. As described previously, the system may determine that a previous virtual background was used for many different meetings. The system may perform processing to determine similarities of contextual information of the different meetings and derive or create rules to use the same virtual background where a planned meeting has similar contextual information as the historical meetings.

In this embodiment, the system may establish a connection to the calendar account of a first user, or other database storing previous meeting information. A calendar account of a user is capable of storing informational details about one or more meetings. The informational details, for example, may include for each meeting: a title for the meeting, participant e-mail addresses of the meeting, a date for the meeting and a time for the meeting. Also, the system 100 may store information for particular virtual backgrounds that were used for past meetings.

The system 100 may evaluate the informational details of prior meetings of the calendar account of the first user. The system may retrieve and generate a dataset include the information details for those meetings where the same virtual background was used.

The system 100 may generate one or more rules for the selection of a virtual background to be used for prospective meetings by the first user. The generated one or more rules may be generated based on an evaluation of the informational details of the prior meetings. For example, the system may determine that similar key words exist in the contextual information for the meetings. The system may then generate a rule where the system would use the same virtual background as previously used, where the key words are found in the contextual information for a planned meeting.

The system 100 may determine, by applying the generated one or more rules, a virtual background to use for a planned meeting.

Virtual Background Template Configuration

Figure 6:
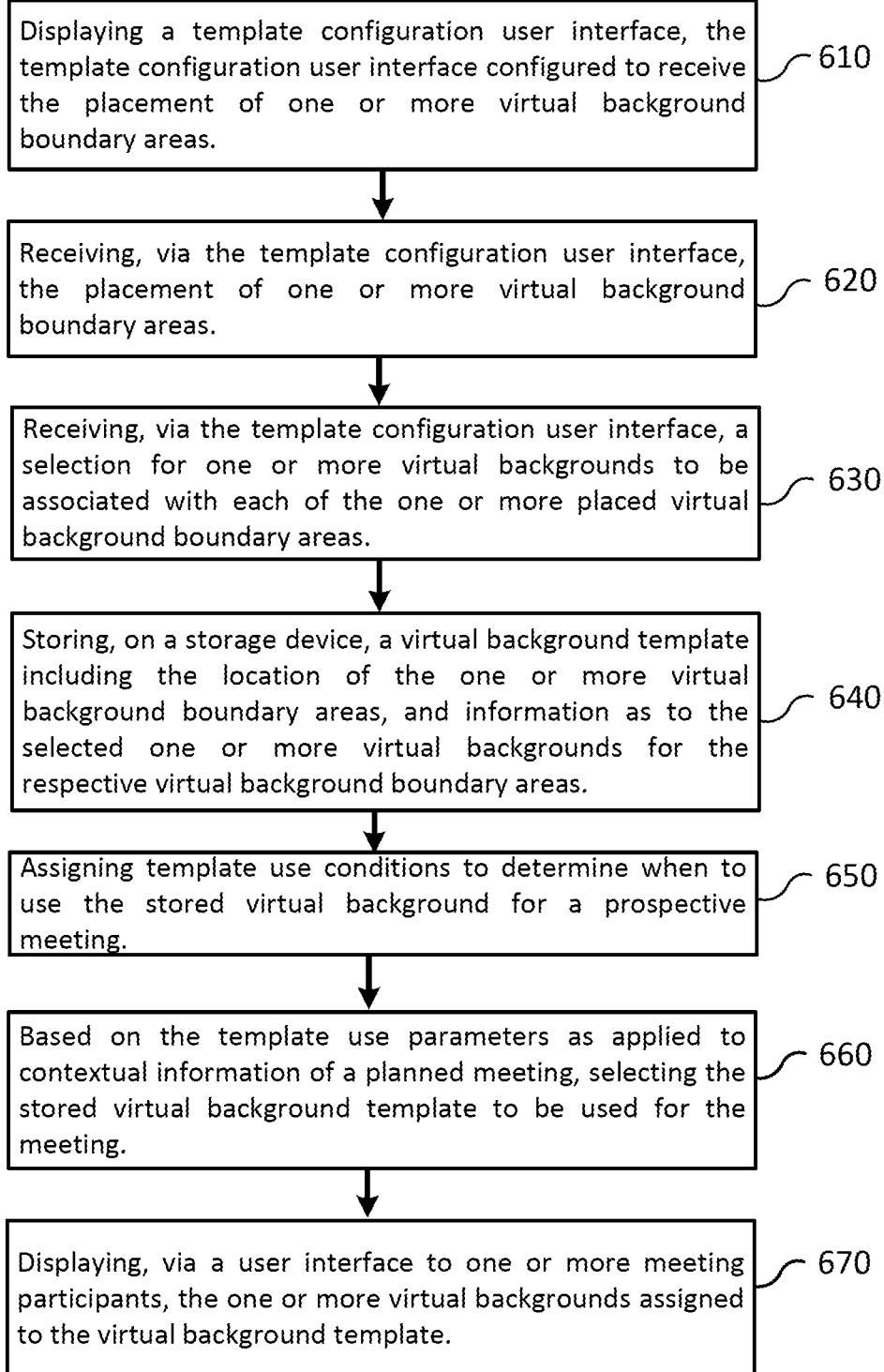
FIG. 6 is a flow chart illustrating an exemplary method 600 that may be performed in some embodiments.

FIG. 6 is a flow chart illustrating an exemplary method 600 that may be performed in some embodiments. The system 100 provides functionality to display a user interface (as further described with respect to FIG. 7) where a user may define a template for the selection of one or more virtual backgrounds to be used for a planned video meeting. The system may then evaluate planned meeting contextual information and select a specific virtual background template to be used for video communication. During video communications by the user, the system would use the virtual backgrounds configured for the selected virtual background template.

At step 610, the system displays a template configuration user interface. The template configuration user interface may be configured to receive the placement of one or more virtual background boundary areas.

At step 620, the system receives, via the template configuration user interface, the placement of one or more virtual background boundary areas. The user interface may receive selection about the template configuration interface of where the user would like to add a virtual background boundary area.

At step 630, the system receives, via the template configuration user interface, a selection for one or more virtual backgrounds to be associated with each of the one or more placed virtual background boundary areas. For each of the virtual background boundary areas, a user may select a virtual background to be displayed within a particular virtual background boundary area.

At step 640, the system stores, on a storage device, the user configured virtual background template including the location of the one or more virtual background boundary areas about the user interface, and the information as to the selected one or more virtual backgrounds for the respective virtual background boundary areas.

At step 650, the system, assigns use conditions/parameters to determine when to use the stored virtual background template for a planned meeting. The use conditions may be preconfigured rules as described herein, such as assigning keywords to be matched as to the contextual information of a planned meeting.

At step 660, the system based on the template use conditions/parameters as applied to the contextual information of a planned meeting, selecting the stored virtual background template to be used for the meeting.

At step 670, the system 100 displays, via a user interface, to one or more meeting participants during a video meeting, the one or more virtual backgrounds assigned to the virtual background template.

Virtual Background Template

Figure 7:
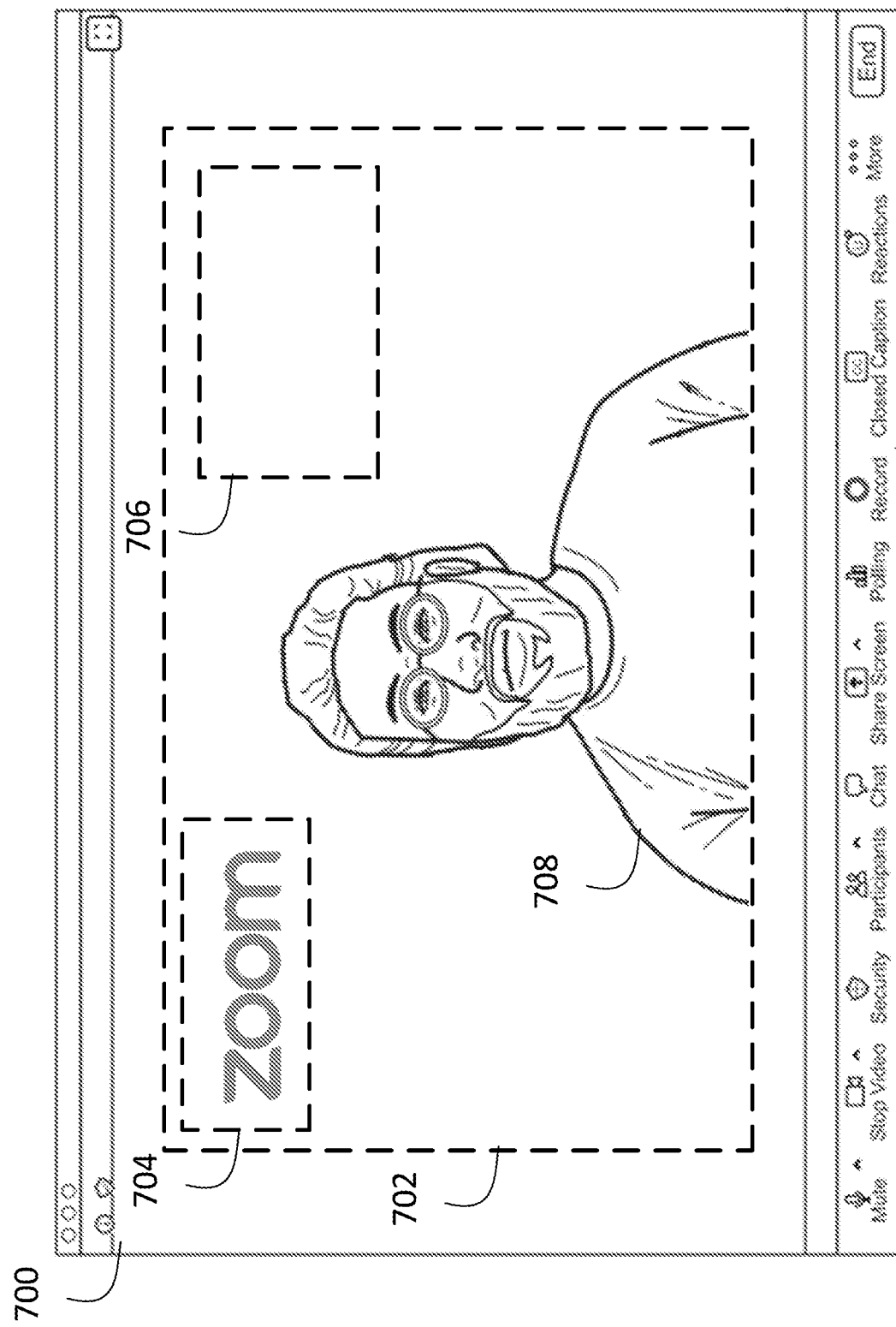
FIG. 7 illustrates an example user interface 700 according to one embodiment of the present disclosure.

FIG. 7 illustrates an example user interface 700 according to one embodiment of the present disclosure. The system 100 may generate and display a user interface 700 where a user may configure a virtual background template to use for video communications with other users. The user interface 700 may provide functionality for the selection and placement of sections and/or borders (i.e., virtual background boundary areas) on the user interface 700 for the display of one or more virtual backgrounds. The virtual background template during configuration may optionally display a video feed of a user 708 during the configuration of the virtual background template.

The system may generate and display the user interface 700 which allows a user to design or configure one or more virtual backgrounds to be displayed during a video communication with other users. A user may select, draw, move, delete and/or resize one or more virtual background boundary areas on the user interface 700 (e.g., using a selection tool via a mouse input, touch input or other input device). The user interface 700 may receive the placement of one or more virtual background boundary area onto the user interface. For example, the user interface 700 depicts three virtual background boundary areas showing a desired placement of three different virtual background boundary areas (represented by the dashed borders 702, 704, 706). A virtual background boundary area may be layered such that top layer (or most forward positioned) virtual background boundary area displays a virtual background over another virtual background during the video communications.

A virtual background boundary area may be associated with a particular virtual background to be displayed during video communications when the virtual background template is selected for use for a meeting. As an example, the virtual background boundary area 704 is associated with a virtual background of a graphical image of the word "ZOOM".

The associated virtual backgrounds for the respective virtual background boundary areas may be stored collectively together as a virtual background template. The virtual background template may include the locations, shape and size of the virtual background boundary areas, and an indication such as a file name, link, identifier or other reference for a specific virtual background to be used in association with the virtual background boundary area. The virtual background template may be stored on a local data storage device and/or a remote storage service. In some embodiments, the virtual background files may be stored along with the virtual background as a collective container of the data, information and files needed to use or recreate the virtual background template.

A particular virtual background template may be associated with pre-configuration rules (i.e., similar to the virtual background rule configuration as discussed previously). Additionally, each of the individual virtual background boundary areas may be associated with the same or different pre-configuration rules. A virtual background boundary area may be associated with a rule that if key words are matched in the contextual information of a planned meeting, then the virtual background boundary area would be displayed. For example, if a preconfigured rule includes the keywords "zoom.com", and the contextual information includes a reference to zoom.com, such as a user email address, then the virtual background boundary area 704 would be initiated and become active during the video meeting, and the system would display the associated virtual background (e.g., the graphical image of the word "ZOOM".)

In some embodiments, each of the virtual background boundary areas may be associated with different or similar preconfigured rules. Also, a particular virtual background boundary area may be associated with multiple preconfigured rules. For example, the virtual background boundary area 704 may also be associated with the keywords "Baseball", and virtual background (such as a logo of one's favorite baseball team) may be associated with the keywords and the virtual background boundary area 704. In this instance, if a planned meeting includes contextual information include a keyword for baseball, then the system 100 would present associated virtual background for the associated baseball team logo. This functionality allows a user to configure a dynamic virtual background template that displays different virtual backgrounds for the same virtual background boundary areas based on a preconfigured rule and the informational content of a planned meeting.

In some embodiments, the user interface 700 may receive a textual input directly into the virtual background boundary area. For example, the user interface 700 may receive the input for the word Hobby, CompanyName, etc. The system 100 may receive and store user input tags for different virtual backgrounds. For example, system 100 may receive a tag from a user input, associating a particular virtual background with the tag. In one instance an image to be used as a virtual background may be tagged with the word "Hobby" and another image tagged with a company name. Then for a planned video meeting, the virtual background would be used where the word "Hobby" or the company name is found in the contextual information for the meeting.

Additionally, the virtual background boundary area may be set as random. In this case, a different virtual background may be automatically choses by the system 100 for each new video meeting in which the user participates.

Virtual Background Synchronization

Figure 8:
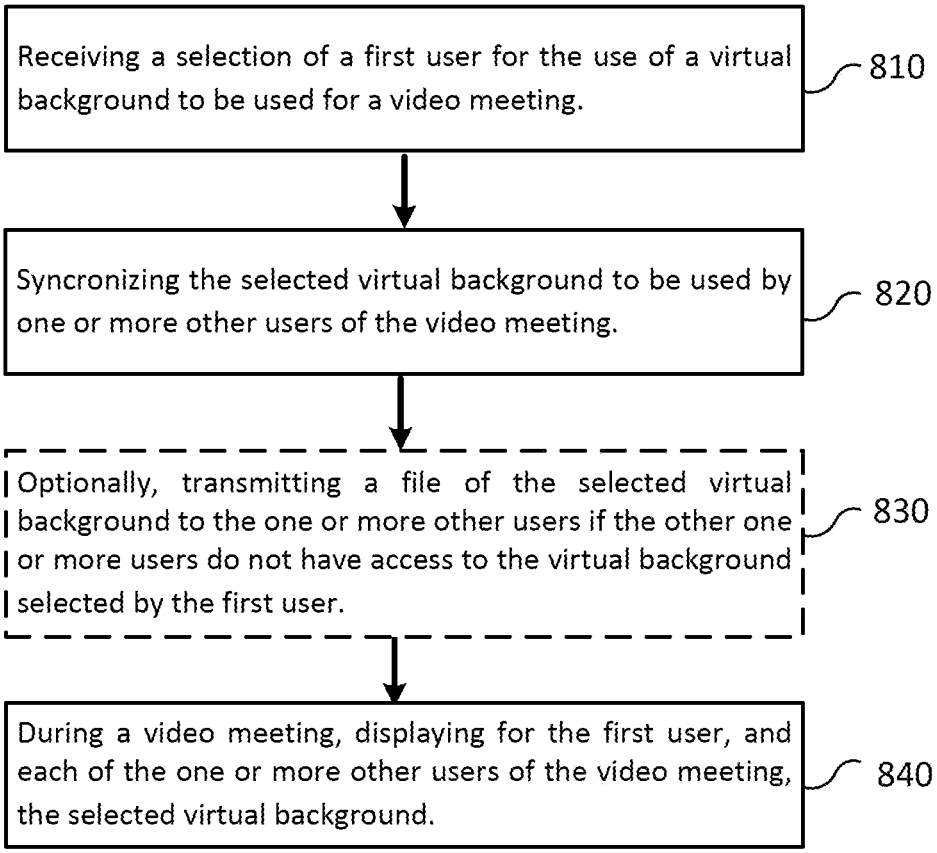
FIG. 8 is a flow chart illustrating an exemplary method 800 that may be performed in some embodiments.

FIG. 8 is a flow chart illustrating an exemplary method 800 that may be performed in some embodiments. The system 100 provides functionality to display a user interface where a first user may select a virtual background to be used for a video meeting. The system 100 will synchronize the virtual background of the other user with the virtual background selected by the first user. The system 100 may optionally transmit a file for the virtual background to those users that do not already have access to the same virtual background selected by the first user. During a video meeting the selected virtual background would be used by the first user and at least one other user.

At step 810, the system receives a selection of a first user for the use of a virtual background to be used for a video meeting. For example, a user may select which virtual background should be used for a meeting. Alternatively, the system may use a preconfigured rule to select a virtual background to be used for the meeting.

At step 820, the system synchronizes the selected virtual background to be used by one or more other users of the video meeting. The system provides for the selection of one or more other user to use the selected virtual background. This functionality provides, for example, a meeting admin, meeting host, etc., to enforce a common virtual background to be used by the other meeting participants.

At step 830, the system optionally transmits a file of the selected virtual background to the one or more other users if the other one or more users do not have access to the virtual background selected by the first users. For example, a user may not have access to virtual background selected by the first user. In this instance, the system may transmit a file of the selected virtual background to the other user. The other user may the receive and store the received virtual background on their local or cloud data storage device.

At step 840, during a video meeting, the system displays for the first user, and each of the one or more other users of the video meeting, the selected virtual background. The first user and the other users would display during the video meeting the virtual background as selected by the first user.

Figure 9:
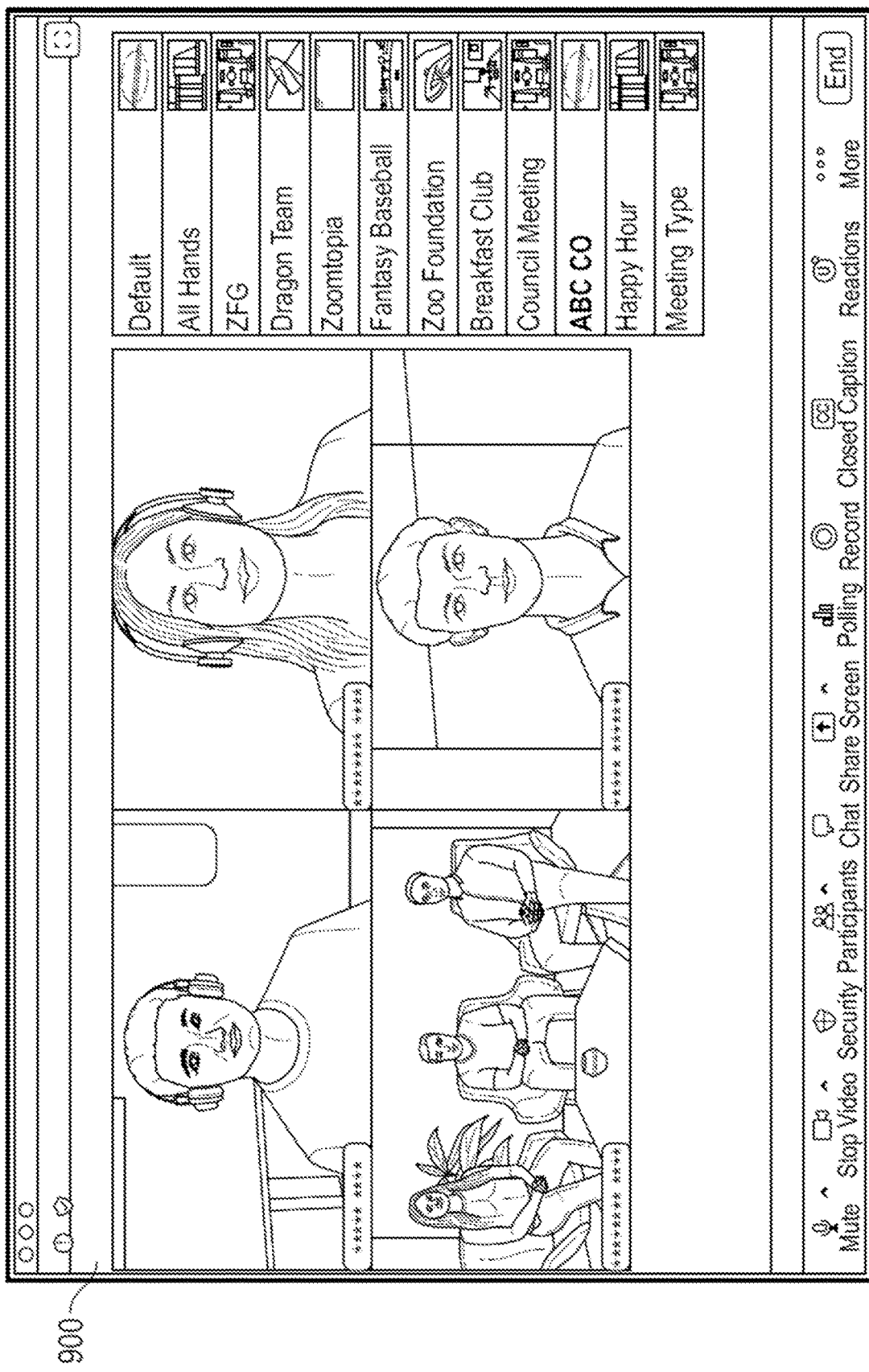
FIG. 9 illustrates an example user interface 900 according to one embodiment of the present disclosure.

FIG. 9 illustrates an example user interface according to one embodiment of the present disclosure. In some embodiments, the user interface allows the presentation of different virtual backgrounds for selection by a user. The system retrieves from a data storage device one or more virtual background files that correspond to preconfigured rules for the user. The displayed listing of virtual backgrounds for one user may be different than the listing of virtual backgrounds for other users. The selection and display of the virtual backgrounds may depend upon the preconfigured rules for each user and on the contextual information of the meeting in which the users participate.

In some embodiments, the system synchronizes the displayed virtual backgrounds and displays at least a group of similar virtual backgrounds for each user participating in the meeting. For example, the system may determine that two or more users have a similar virtual background that may be chosen based on one or more preconfigured rules for the selection of a virtual background based on the contextual information of the meeting. In such instances, where the system determines that each of the users have a same virtual background that may be used for the video meeting, the system may automatically select for use for those users the same virtual background to be used during the meeting.

In some embodiments, a user may select a virtual background to be used by other meeting participants. The system provides functionality allowing a user, such as a host or co-host of a meeting, to select one of the virtual backgrounds to be used by all of the meeting participants, a group of meeting participants, and/or or specific identified meeting participants. For example, this functionality is especially useful in that the system allows a host to select which virtual background would be used for the meeting for some or all of the users. In a situation where employees of the same company are meeting with another company, a user of the company hosting the meeting can ensure a consistent virtual background to be used by all of the users of the company participating on a video conference call. Where a user selects a virtual background for use by certain users or all of users, the system would cause the selection of the particular virtual backgrounds to be used by each of the certain users. When the certain users participate in a video meeting, each of their virtual backgrounds would be uniformly displayed with the same virtual background.

In some embodiments, a user, such as a meeting host or admin, may assign a virtual background to be used by the particular user. As described with respect the planned meeting contextual information, a primary user may assign a virtual background to be used directly for a user. During the video meeting, the primary user assigned virtual background would then be used by the respective users. In alternative embodiments, the primary user may assign a particular virtual background to be used by all meeting participants. In other words, a virtual background may be assigned at a meeting level where each meeting participant would be displayed with the same virtual background.

Dynamic Virtual Background Selection

Figure 10:
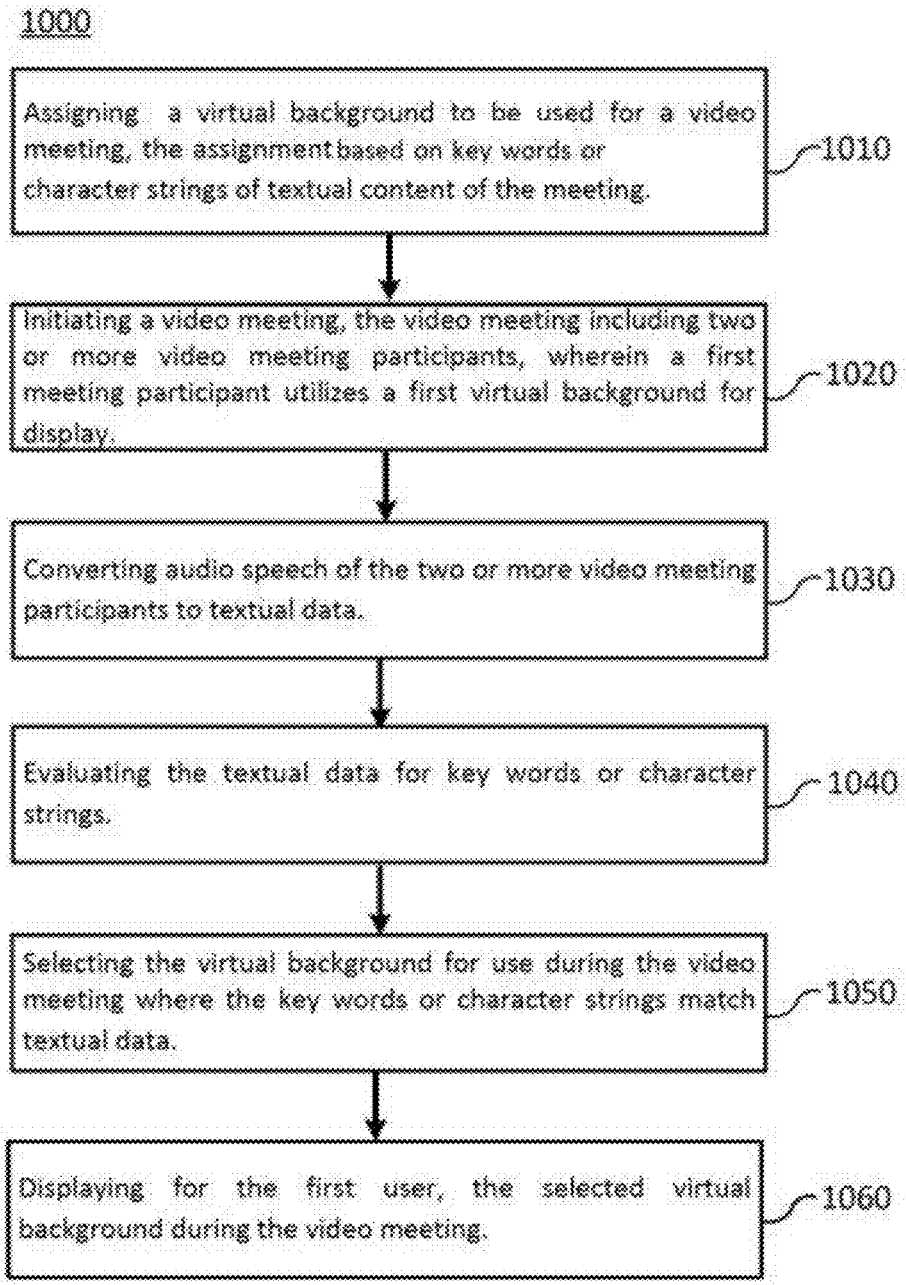
FIG. 10 is a flow chart illustrating an exemplary method 1000 that may be performed in some embodiments.

FIG. 10 is a flow chart illustrating an exemplary method 1000 that may be performed in some embodiments. In some embodiments, the system may evaluate meeting content and select a virtual background for a user based on the evaluated meeting context.

Speech-to-Text and Selection of Virtual Backgrounds

In one embodiment, the system may convert speech-to-text and based on an evaluation of the text determine a virtual background to use, or dynamically change to during the meeting.

In reference to FIG. 10, at step 1010, the system 100 assigns a virtual background to be used for a video meeting, the assignment based on key words or character strings of textual content of the meeting.

At step 1020, the system 100 initiates a video meeting, the video meeting including two or more video meeting participants, wherein a first meeting participant utilizes a first virtual background for display.

At step 1030, the system 100 convert audio speech of the two or more video meeting participants to textual data.

At step 1040, the system 100 evaluates the textual data for key words or character strings.

At step 1050, the system 100 selects the virtual background for use during the video meeting where the key words or character strings match textual data.

At step 1060, the system 100 displays for the first user, the selected virtual background during the video meeting or for at least a portion of the video meeting.

Object Detection of User Video and Selection of Virtual Backgrounds

In other embodiments, the system 100 may evaluate the video stream of a user and determine a virtual background to use for video communications based on text found in the video stream of a user. For example, the system 100 may receive video frames, evaluate the video frames and identify one or more objects in the video frames. The system 100 may determine whether an object includes textual information, such as the name on a hat and/or a logo on a t-shirt. The system 100 may then suggest to a user or automatically select a virtual background to use for video communications that is associated with the text identified in one or more objects of the video frames.

In other embodiments, the system 100 may evaluate the video stream of a user and determine a virtual background to use for video communications based on motions of the user. For example, the system 100 may receive video frames, evaluate the video frames and identify user motions in the video frames. The system 100 may determine whether a particular motion has been made (for example, hand signing or performing a gesture with the hands, or head movement). The motion may be associated with a particular virtual background to be used when the motion is identified by the system. For example, the system 100 may detect that a user is performing the motion of waving goodbye, the system 100 may in response display a virtual background associated with the detected waving goodbye motion.

Exemplary Computer System

Figure 11:
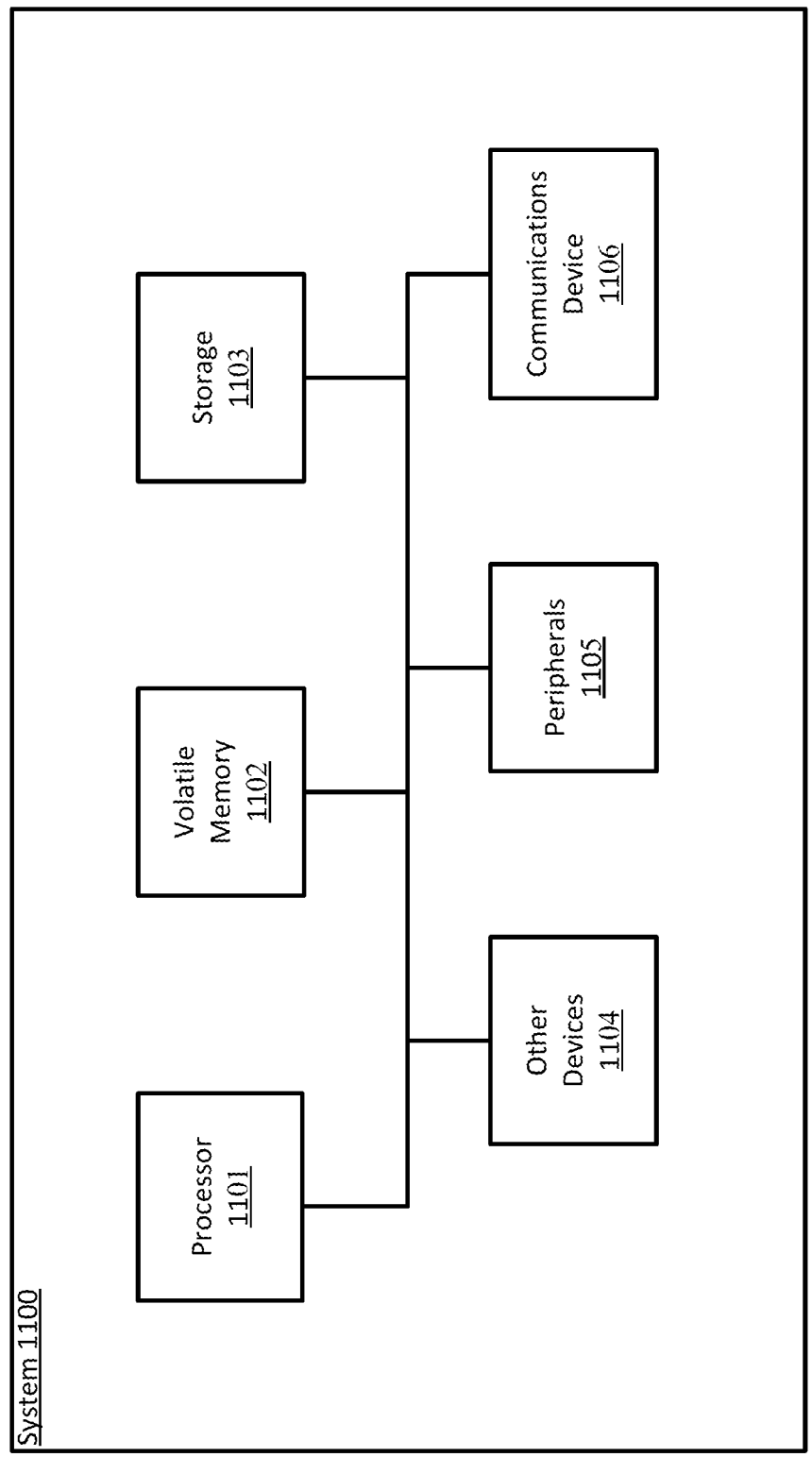
FIG. 11 is a diagram illustrating an exemplary computer system 1100 that may perform processing in some embodiments.

FIG. 11 is a diagram illustrating an exemplary computer that may perform processing in some embodiments. Exemplary computer 1100 may perform operations consistent with some embodiments. The architecture of computer 1100 is exemplary. Computers can be implemented in a variety of other ways. A wide variety of computers can be used in accordance with the embodiments herein.

Processor 1101 may perform computing functions such as running computer programs. The volatile memory 1102 may provide temporary storage of data for the processor 1101. RAM is one kind of volatile memory. Volatile memory typically requires power to maintain its stored information. Storage 1103 provides computer storage for data, instructions, and/or arbitrary information. Non-volatile memory, which can preserve data even when not powered and including disks and flash memory, is an example of storage. Storage 1103 may be organized as a file system, database, or in other ways. Data, instructions, and information may be loaded from storage 1103 into volatile memory 1102 for processing by the processor 1101.

The computer 1100 may include peripherals 1105. Peripherals 1105 may include input peripherals such as a keyboard, mouse, trackball, video camera, microphone, and other input devices. Peripherals 1105 may also include output devices such as a display. Peripherals 1105 may include removable media devices such as CD-R and DVD-R recorders/players. Communications device 1106 may connect the computer 100 to an external medium. For example, communications device 1106 may take the form of a network adapter that provides communications to a network. A computer 1100 may also include a variety of other devices 1104. The various components of the computer 1100 may be connected by a connection medium such as a bus, crossbar, or network.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method, comprising:
   identifying a virtual background associated with a first user of a virtual meeting;
   in response to identifying the virtual background associated with the first user, synchronizing a device associated with a second user of the virtual meeting to use the virtual background during the virtual meeting; and
   generating, for display on a device connected to the virtual meeting, a composite video depicting the first user or the second user overlaid on the virtual background.

2. The method of claim 1, further comprising:
   selecting a virtual background template; and
   obtaining the virtual background by configuring the virtual background template to include a graphical element that is based on a context of the virtual meeting.

3. The method of claim 1, wherein synchronizing the device associated with the second user of the virtual meeting to use the virtual background during the virtual meeting comprises:
   determining that a file associated with the virtual background is not available at the device of the second user; and
   in response to determining that the file associated with the virtual background is not available at the device of the second user, transmitting the file to the device associated with the second user.

4. The method of claim 1, wherein identifying the virtual background associated with the first user of the virtual meeting comprises:
   identifying the virtual background based on at least one of a title or a description of the virtual meeting.

5. The method of claim 1, further comprising:
selecting the virtual background based on rules evaluated against a context of the virtual meeting.

6. The method of claim 5, wherein the context includes keywords.

7. The method of claim 5, wherein the context includes email domains.

8. A system, comprising:
one or more memories; and
one or more processors, the one or more processors configured to execute instructions stored in the one or more memories to:
identify a virtual background associated with a first user of a virtual meeting;
in response to identifying the virtual background associated with the first user, synchronize a device associated with a second user of the virtual meeting to use the virtual background during the virtual meeting; and
generate, for display on a device connected to the virtual meeting, a composite video depicting the first user or the second user overlaid on the virtual background.

9. The system of claim 8, wherein the virtual background is selected based on rules evaluated against a context of the virtual meeting, and wherein the context includes keywords or a presence of certain email domains in email addresses of at least some participants of the virtual meeting.

10. The system of claim 8, wherein the virtual background is retrieved from a set of backgrounds stored in a virtual background repository.

11. The system of claim 8, wherein the virtual background is identified based on historical use of the virtual background.

12. The system of claim 8, the one or more processors configured to execute instructions stored in the one or more memories to:
transmit a file associated with the virtual background to the device associated with the second user.

13. The system of claim 8, wherein the virtual background is identified based on a title of the virtual meeting.

14. The system of claim 8, wherein the virtual background is identified based on domain names associated with participants of the virtual meeting.

15. One or more non-transitory computer readable media storing instructions operable to cause one or more processors to perform operations comprising:
identifying a virtual background associated with a first user of a virtual meeting;
in response to identifying the virtual background associated with the first user, synchronizing a device associated with a second user of the virtual meeting to use the virtual background during the virtual meeting; and
generating, for display on a device connected to the virtual meeting, a composite video depicting the first user or the second user overlaid on the virtual background.

16. The one or more non-transitory computer readable media of claim 15, wherein the operations further comprise:
retrieving contextual information from a calendaring application, wherein the virtual background is identified based on the contextual information.

17. The one or more non-transitory computer readable media of claim 15, wherein the operations further comprise:
accessing past meeting data associated with the first user, wherein the past meeting data includes previously used virtual backgrounds; and
based on a frequency and context of the previously used virtual backgrounds, generating a rule that, when evaluated, results in the virtual background being identified for the virtual meeting.

18. The one or more non-transitory computer readable media of claim 15, wherein the operations further comprise:
obtaining the virtual background by configuring a virtual background template based on a context of the virtual meeting.

19. The one or more non-transitory computer readable media of claim 15, wherein the operations comprise:
transmitting a file associated with the virtual background to the device associated with the second user.

20. The one or more non-transitory computer readable media of claim 15, wherein
identifying the virtual background associated with the first user of the virtual meeting comprises:
applying a set rules to identify the virtual background based on keywords associated with the virtual meeting.

* * * * *